United States Patent
Petersen

(10) Patent No.: US 6,945,067 B2
(45) Date of Patent: Sep. 20, 2005

(54) ICE CREAM FREEZER

(75) Inventor: Tage Petersen, Vojens (DK)

(73) Assignee: Gram Equipment A/S, Vojens (DK)

( * ) Notice: Subject to any disclaimer, the term of this patent is extended or adjusted under 35 U.S.C. 154(b) by 0 days.

(21) Appl. No.: 10/451,112

(22) PCT Filed: Dec. 21, 2001

(86) PCT No.: PCT/DK01/00865

§ 371 (c)(1), (2), (4) Date: Jun. 19, 2003

(87) PCT Pub. No.: WO02/056985

PCT Pub. Date: Jul. 25, 2002

(65) Prior Publication Data

US 2004/0107722 A1 Jun. 10, 2004

(30) Foreign Application Priority Data

Dec. 22, 2000 (DK) .................................. 2000-00388 U

(51) Int. Cl.⁷ .............................................. A23G 9/12
(52) U.S. Cl. ...................................................... 62/342
(58) Field of Search .................................... 62/342, 343

(56) References Cited

U.S. PATENT DOCUMENTS

| | | | |
|---|---|---|---|
| 1,692,964 A | 11/1928 | Thompson | |
| 2,050,975 A | 8/1936 | Morrow | |
| 2,997,859 A | 8/1961 | Gram | |
| 3,183,681 A * | 5/1965 | Lutz et al. | 62/135 |
| 3,220,213 A | 11/1965 | Wakeman et al. | |
| 3,228,203 A * | 1/1966 | Swenson | 62/135 |
| 3,568,463 A * | 3/1971 | McMichael et al. | 62/343 |
| 4,201,558 A * | 5/1980 | Schwitters et al. | 62/70 |
| 4,522,041 A * | 6/1985 | Menzel | 62/342 |
| 4,817,396 A | 4/1989 | Menzel | |
| 5,201,861 A * | 4/1993 | Menzel | 62/135 |
| 5,680,769 A * | 10/1997 | Katz | 62/68 |
| 5,755,106 A * | 5/1998 | Ross | 62/217 |

FOREIGN PATENT DOCUMENTS

DE 2518278 11/1975

* cited by examiner

Primary Examiner—William E. Tapolcai
(74) Attorney, Agent, or Firm—James Creighton Wray; Meera P. Narasimhan

(57) ABSTRACT

There is disclosed an ice cream freezer comprising a system (1) including a freezer pipe (8) and a cooling system (9), a pipe system I is used for introducing ingredients by means of an introducing pump (1). A pipe system (U) is used for removing finished ice cream by means of a motor (10). There are provided indicators (4, 6) for recording parameters such as pressure temperature flow. In order to provide a situation where condensate dripping which may damage sensitive parts, and which at the same time is service and cleaning friendly, the freezer pipe (8) is placed under the other elements. The cooling system is placed in immediate vicinity of the freezer pipe (8). By this disposition, dripping due to condensate on freezer pipe/cooling system may only drip down on the floor and not onto sensitive components. Possible leakage in the ingredient pipe system I may only drip on freezer pipes that can stand flushing.

13 Claims, 2 Drawing Sheets

ICE CREAM FREEZER

This application claims the benefit of Danish Application No. BA 2000 00388 filed Dec. 22, 2000 and PCT/DK01/00865 filed Dec. 21, 2001.

BACKGROUND OF THE INVENTION

The present invention concerns an ice cream freezer including a frame in which is mounted freezer pipe, a cooling system, a pipe system with pump, valves etc. for introducing ingredients to the freezer pipe, a pipe system with pump for removing finished ice cream from the freezer pipe, motors for driving freezer pipe and pumps and a number of indicators for recording parameters such as pressure, temperature, flow.

The industrial ice cream freezers known presently do not differ much from each other. Typically, the freezers are built up as a rustproof box with removable coverings. The rustproof box is built up over a frame, and at the outer side of the box there are connections for introducing ingredients and removing finished ice cream from the freezer.

The main part of the components of the freezers in the form of pipe system, valves, indicators, cooling system etc. is located within the coverings. Usually, for practical reasons, only an inlet and outlet pump will be disposed at the outer side of the coverings. It has been common to place freezer pipes at a central position with the cooling system arranged above the freezer pipe.

The prior art ice cream freezers have been connected with several drawbacks. Since the cooling system and freezer pipe become cold, frosting and condensate will be formed. This frosting and condensate may drip onto underlying components. This will be particularly disadvantageous when these are sensitive, either because they are electrically driven or only poorly stands constant water dripping.

Furthermore, leaks may arise in the couplings of the ingredient pipe system. Hereby, ingredients may drip onto underlying components in the form of motors or other components which are difficult to clean and/or are sensitive to the influence.

In ice cream freezers made traditionally as rustproof boxes, leakage or malfunction in one of the inner components will not be immediately visible. A leakage or malfunction may thus occur through long time before it is discovered by an operator.

SUMMARY OF THE INVENTION

It is the purpose of the present invention to indicate an ice cream freezer of the kind mentioned in the introduction where these drawbacks are relieved as one avoids the risk of condensate dripping upon sensitive components.

According to the present invention, this is achieved with an ice cream freezer being peculiar in that the freezer pipe is disposed below the other elements and that the cooling system is disposed in immediate vicinity of the freezer pipe.

Since the freezer pipe and the cooling system are disposed under the other elements, condensate dripping from cooling system and/or freezer pipe may only drip down on the floor or a collecting tray with drain hole and not onto sensitive components.

It is possible to place the cooling system at the end of the frame being opposite the end where introducing and removing pipes are disposed. Hereby, the cooling system is placed in immediate vicinity of the freezer pipe without increasing the overall height of the facility, such as being the case if it had bed placed above the freezer pipe, and without increasing the width of the facility, such as being the case if the cooling system had been placed at the side of the freezer pipe within the frame.

According to an advantageous embodiment, the introducing pipe system and the indicators are mounted at a position over or beside the freezer pipe. Furthermore, the frame may be provided with coverings of which at least some are transparent. If a leak occurs in one of the couplings in the ingredient pipe system, such a leakage will quickly be recognised through the transparent coverings. Furthermore, after sealing/repair cleaning may easily be performed without any risk of hitting motors or the like, if ice cream freezers comprise an upper closed box containing motors, valves and other sensitive components. By placing such sensitive components in an upper closed box, they are protected against dripping from condensate or leaks in the ingredient supply system, and will futhermore be protected against spatter when flushing is performed. An air system for the ice cream system will also be placed in the upper closed box.

The drips occurring from the ingredient pipe system may only hit the freezer pipe and possibly the cooling system. These parts are usually designed so that they can stand flushing.

If the coverings only cover the upper part of the frame, which is disposed above the freezer pipe and the pipe system for introducing ingredients, it will be easy to access the ingredient pipe system and freezer pipe with the purpose of maintenance and cleaning. Thus there will not be any need for removing coverings in order to perform daily maintenance.

In order to get necessary access to the components placed behind the covering, these will be arranged opening or removable on the frame.

BRIEF DESCRIPTION OF THE DRAWINGS

The invention will then be explained in more detail with reference to the accompanying drawing, where.

DETAILED DESCRIPTION OF THE PREFERRED EMBODIMENTS

Figure 1:
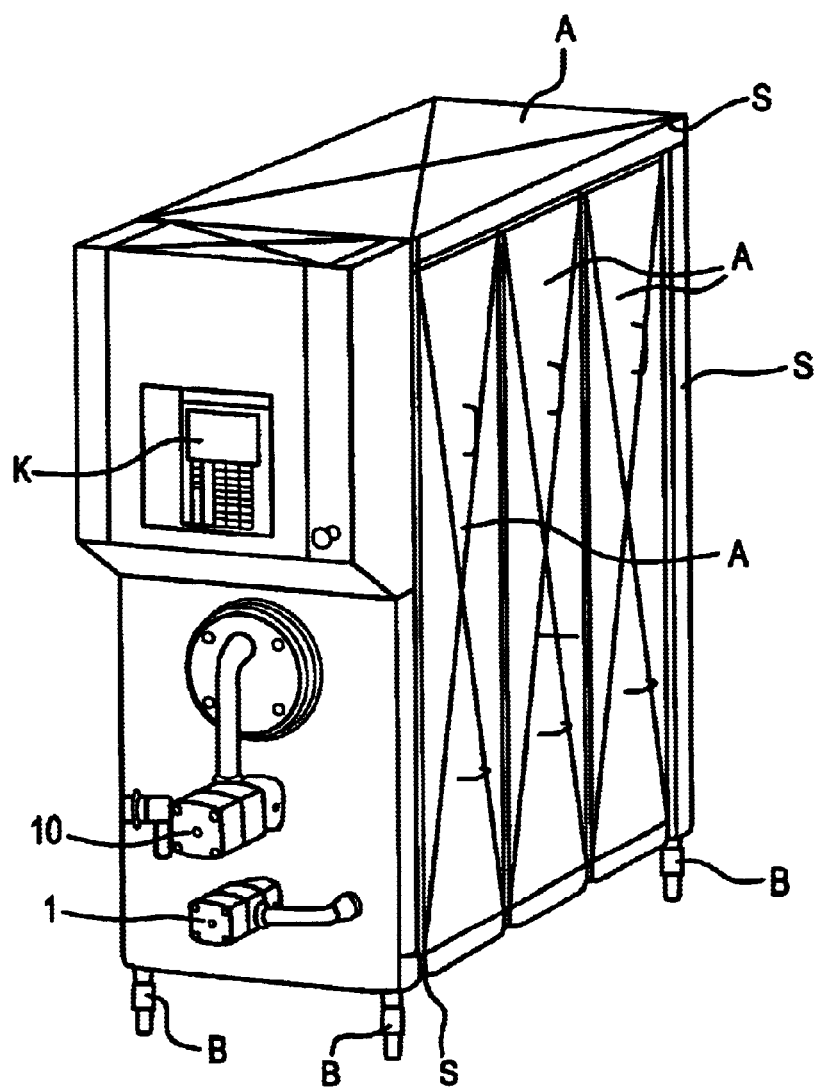
FIG. 1 shows the principle of a prior art ice cream freezer provided with coverings.

FIG. 1 illustrates a typical industrial ice cream freezer in the form of a large rustproof box. The box is provided with removable coverings A mounted on a stand S forming a frame for the coverings A. The ice cream freezer is placed on the legs B. The freezer is provided with a control unit K used for monitoring and controlling the different components of the freezer.

The freezer comprises a pump 1 for introducing ingredients to the freezer and a pump 10 for removing finished ice cream. These pumps are placed outside upon the box formed by the coverings A.

Figure 2:
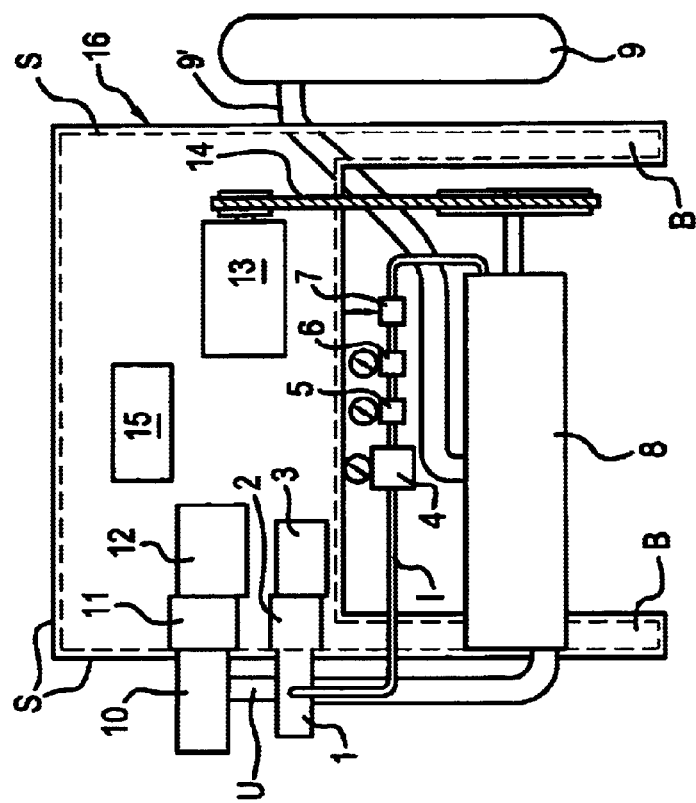
FIG. 2 shows a schematic view of the structure of a prior art freezer.

FIG. 2 shows schematically the structure of the freezer depicted in FIG. 1 as the control unit K, however, is omitted.

The ingredients for the ice cream is pumped by means of the pump 1 into the freezer. The pump 1 is driven by means of a gear 2 that may be provided in the form of a gear or a belt/chain drive of a motor 3.

The ingredients are introduced via an introducing pipe system 1 that may contain a flow meter 4, a pressure transmitter/pressure gauge 5, a temperature transmitter/thermometer 6 and an air supply unit 7 into a freezer pipe 8 where the ice cream is formed.

In the freezer pipe is rotating a (not shown) shaft which scrapes ice from the wall of the freezer pipe and mixes ingredients and air. The shaft is driven by means of a gear 14 by a motor 13.

Above the freezer pipe 8 is provided a cooling system 9 comprising a container and a pipe system connected with the freezer pipe via connecting pipe 9'. The finished ice cream is removed from the freezer pipe 8 via a removal pipe system U containing a pump 10. The pump 10 is via a gear 11 in the shape of a gear or belt/chain drive of a motor 12.

The ice cream freezer will furthermore include an air system generally designated 15 and comprising filters, valves etc.

As it appears from FIG. 1, freezer pipe and cooling system 8,9 are situated uppermost in the freezer. Motors 3,12 and gears 2,11 lie here under but not necessarily at the same level. The greater part of the ingredient pipe system 1 including indicators 4,5,6 and the air supply component 7 are disposed under cooling pipes and cooling system. The motor 13 driving the shaft in the freezer pipe is usually placed lowermost in the freezer.

The broken lines indicate the stand S with the coverings which are placed around all components.

As mentioned above, this arrangement is disadvantageous in that frosting and condensate from freezer pipe 8 and cooling system 9 can drip on the underlying components and thereby cause risk of functional failure and damage. Furthermore, leaks in couplings in the ingredient pipe system I may give rise to drip on underlying motors 3, 13 (and possibly 12) and other components which are difficult to clean.

Below, an ice cream freezer according to the invention will be explained with regard to FIG. 3. As identical parts are indicated with the different figures of the drawing, no specific explanation will be given.

Figure 3:
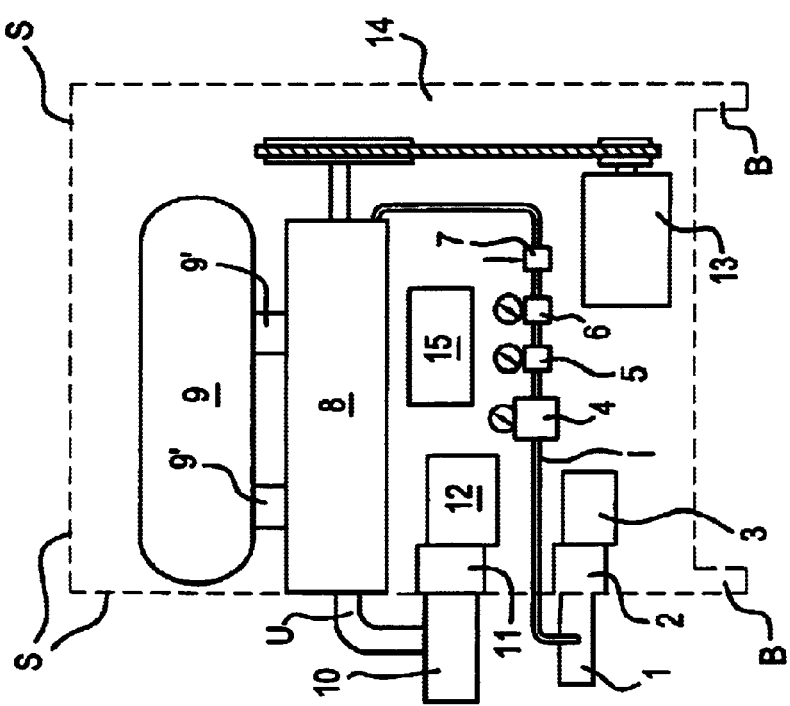
FIG. 3 shows schematically the structure of an ice cream freezer according to the invention.

As it immediately appears from FIG. 3, individual components in the ice cream freezer are disposed with a mutual position being substantially different from that illustrated in FIG. 2. It appears that the stand S includes a covering providing an upper closed box 16 which is placed on high legs B. The freezer pipe 8 and the introducing pipe system 9 with indicator 4, 6 provided therein and the air supply unit 7 are disposed under the closed box 16. The closed box 16 is provided with transparent covering plates having an extension corresponding to the broken lines.

It appears that the motors 1 and 10 for introducing and removing ingredients and finished ice cream, respectively, are disposed at one end of the stand S. At the other end of the stand, the cooling system 9 is located. In the position shown, the cooling system 9 is placed at the outside of the stand and via the pipe connection 9' connected with the freezer pipe 8. It is seen that the pipe connection 9' of the cooling system is disposed below the ingredient pipe system I with associated components so that dripping on possible electronics in the indicators 4,5,6 and the unit 7 due to condensate is avoided. Alternatively, the same advantage may be achieved by placing 9' and I at each their side in the freezer.

In the closed box 16, motors, pump gears and air system are located.

With the shown lay-out of the ice cream freezer according to the invention, condensate dripping from cooling system 9 and freezer pipe 8 may only drip down onto the floor and not on sensitive components. If there is leakage in the ingredient pipe system, this will be seen immediately. Furthermore, immediately after sealing/repair, one may flush the components without risk of hitting motors, air system and other sensitive components as these are placed in the upper closed box.

If leaks occur in a coupling in the ingredient pipe system, dripping may only hit the freezer pipe which usually will be designed to stand flushing. There will be no risk of such drips hitting motors or other components which are difficult to clean.

What is claimed is:

1. An ice cream freezer comprising a frame with a freezer pipe mounted thereon, a cooling system, an introducing pipe system with an introducing pump, valves for introducing ingredients to the freezer pipe, a removing pipe system with removing pump for removing finished ice cream from the freezer pipe, motors for driving the freezer pipe and the pumps and a plurality of indicators for recording different parameters, wherein the freezer pipe is disposed at a lowest point of the freezer and wherein the cooling system is disposed proximal the freezer pipe, the frame comprising coverings, an upper part of the coverings being openable or removable, and the coverings comprising an upper closable box containing motors, valves and other sensitive components.

2. The ice cream freezer of claim 1, further comprising introducing pipe system and removing pipes disposed on a same end of the frame, and wherein the cooling system is disposed at an opposite end of the frame.

3. The ice cream freezer of claim 2, wherein the introducing pipe system and the indicators are mounted above or beside the freezer pipe.

4. The ice cream freezer of claim 1, wherein at least a part the coverings are transparent.

5. The ice cream freezer of claim 1, wherein the coverings only cover a part of the frame situated above the freezer pipe.

6. The ice cream freezer of claim 1, wherein the parameters include pressure, temperatures flow, and combinations thereof.

7. An ice cream freezer comprising a frame, a freezer pipe mounted thereon and disposed at a lowest point of the freezer, a cooling system proximal the freezer pipe, an introducing pipe system with an introducing pump, valves for introducing ingredients in the freezer pipe, a removing pipe system with removing pump for removing finished ice cream from the freezer pipe, motors for driving the freezer pipe and the pumps, a plurality of indicators for recording different parameters, the introducing pipe system and the removing pipes being disposed on one end of the frame and the cooling system being disposed on another end of the frame, further comprising coverings on the frame having upper portions, wherein the coverings comprise an upper closable box containing motors, valves and other sensitive components.

8. The ice cream freezer of claim 7, wherein the introducing pipe system and the indicators are mounted above or beside the freezer pipe.

9. The ice cream freezer of claim 7, wherein the parameters are selected from the group including of pressure, temperature, flow, and combinations thereof.

10. The ice cream freezer of claim 7, wherein the upper portions form an opening.

11. The ice cream freezer of claim 7, wherein the upper portions are removable.

12. The ice cream freezer of claim 7, wherein at least a part the coverings are transparent.

13. The ice cream freezer of claim 7, wherein the coverings only cover a part of the frame situated above the freezer pipe.

* * * * *